United States Patent Office 2,706,259
Patented Apr. 12, 1955

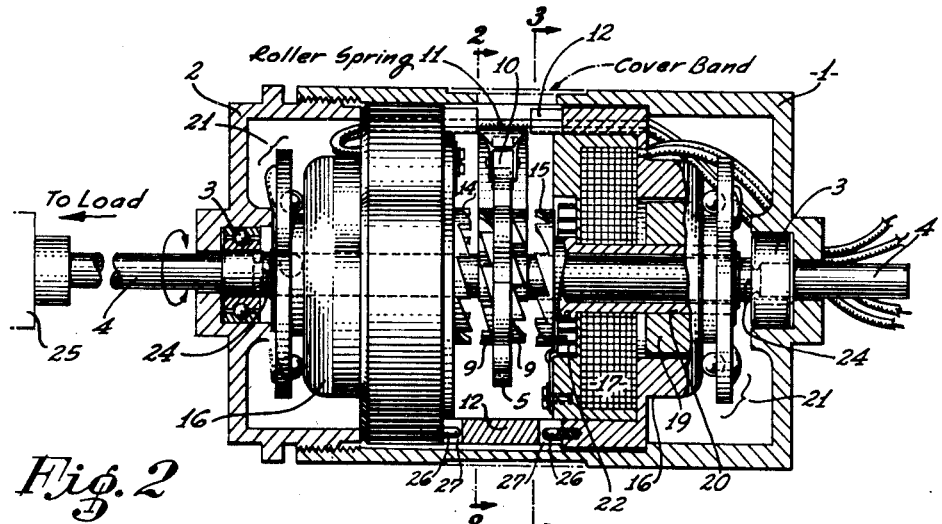
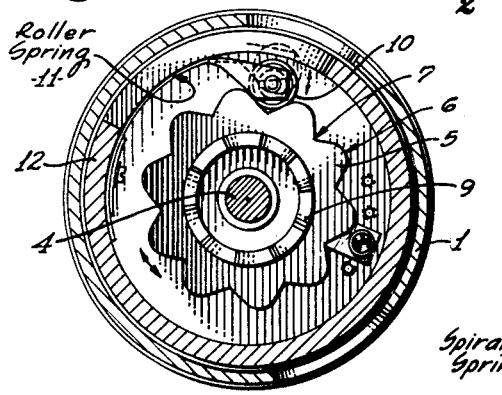
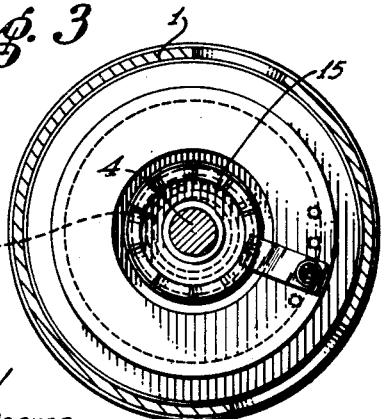
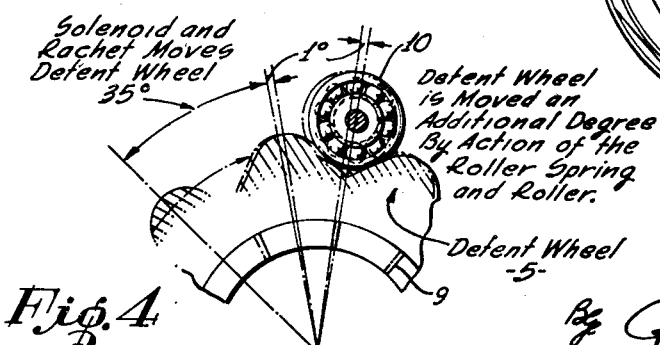

2,706,259

STEPPER MOTOR

Walter H. White, Glendale, Calif., assignor to Northrop Aircraft, Inc., Hawthorne, Calif., a corporation of California Application June 8, 1953, Serial No. 360,055

9 Claims. (Cl. 310—22)

The present invention relates to stepping motors, and more particularly, to a reversible high speed stepping motor of great accuracy for digital servo applications.

Many control systems designed for remote control of driven members to be precisely adjusted to any of a multitude of positions, require a stepping motor operable by electrical pulses. This stepping motor, especially in the more complex mathematically operated machinery, is required to accurately cause a given increment of movement of the driven member for each input pulse to the stepper. A problem not yet satisfactorily solved is that infrequently the stepper will fail to cause the desired output for one or more of a series of pulses, thus giving a false output indication or position. Other problems, too, such as overshoot, failure of parts, etc., also contribute to inaccuracies.

It is an object of this invention to provide a sure and dependable means of transferring stepping motor input to driven member output so that there will be no loss of input signal, and means for accurate positioning of the driven member so that the driving member always functions properly.

My invention will be clearly comprehended by the following detailed description of a specific embodiment thereof, taken in conjunction with the accompanying drawings, in which:

Figure 1 is a side view, mostly in longitudinal section, of a dual unit rotary stepping motor assembly, showing two ratchet drive wheels positioned on opposite sides of a driven detent wheel.

Figure 2 is a cross section taken through the assembly as indicated by line 2—2 in Figure 1, showing detent wheel and roller spring orientation.

Figure 3 is a cross section taken through the same assembly as indicated by line 3—3 in Figure 1, showing a face view of one ratchet drive wheel and spiral return spring therefor.

Figure 4 is an enlarged detail view of a portion of the detent wheel and roller of Figure 2, showing angular relationships in the operation of the device.

Referring first to Figure 1 for the detailed description, a housing 1 carries a threaded end case 2, and a shaft bearing 3 is provided in each end of this assembly, aligned coaxially. The bearings 3 rotatably mount an output shaft 4, at the center of which is attached a detent wheel 5. The detent wheel 5, as also shown in Figure 2, has a series of ten lobes 6 defining an equal number of detents 7 around the wheel's perimeter. A set of ten driven ratchet teeth 9 is formed on each side of the detent wheel 5, facing toward opposite respective ends of the housing 1. A roller 10 presses radially inwardly on the perimeter of the detent wheel 5, as loaded by a roller spring 11 fastened to a rigid collar 12.

A pair of ratchet drive wheels 14 and 15 is located, one opposite each set of ratchet teeth 9 on the detent wheel 5. Each ratchet drive wheel 14 and 15 is an integrally attached output member of one of two rotary solenoids 16 fixed within the housing 1 and fitting against opposite sides of the collar 12.

Each rotary solenoid 16 is a conventional unit comprising an electromagnetic coil 17, armature 19 with hollow armature shaft 20, and ball bearing means 21 acting on the inclined plane principle, so that when the coil 17 is energized, the armature 19 is pulled inwardly, and the armature shaft 20 forced to rotate as directed by the ball bearing means 21 turning around and down in inclined ball races. This imparts a rotary stroke of 45° (in this particular apparatus) to the ratchet drive wheel 14 or 15, which is integrally formed on the armature shaft 20, and an axial stroke of about .031 inch. When the coil 17 is then deenergized, a spiral spring 22 (Figures 1 and 3) returns the armature 19 to a rest position where the ratchet wheel 15 is spaced approximately .003 inch from the ratchet teeth 9 on the detent wheel 5. This axial spacing is enlarged in Figure 1, for clarity of illustration. A pair of shouders 24 on the shaft 4 just inside of the shaft bearings 3 hold the detent wheel 5 and output shaft 4 in a lengthwise centered position. The armature shaft 20 is free to move straight out, if necessary, when the coil 17 is deenergized, thus enabling a return path different from the working stroke path. This occurrence will be referred to later in the description.

Each solenoid 16 is identical, and the ratchet drive wheels 14 and 15 are identical, so that when positioned in opposite relative positions as shown, a load 25 connected to the output shaft 4 will be rotated clockwise when one solenoid is energized, and counterclockwise when the other solenoid is energized. The load may be geared to the output shaft 4 in any desired ratio.

Angular positioning of the ratchet drive wheels 14 and 15 with respect to the detent wheel 5, and operation of the present invention during a power stroke, will now be described. Assume that the first ratchet drive wheel 14 assumes a rest position at the zero-degree reference point. Therefore, during one input pulse interval (one cycle) this wheel 14 rotates to a 45° clockwise position and back to zero, as viewed from the left end, since a 45° stroke was selected for illustration. The rest position of the detent wheel 5 (having 10 detents spaced 36° apart), where the roller 10 is at the bottom of a detent 7, is selected to place the mating ratchet teeth 9 at a 10° position. In other words, the ratchet drive wheel 14 will have to rotate 10° and progress longitudinally a small amount before picking up the ratchet teeth 9 on the detent wheel 5. This leaves 35° remaining of the ratchet drive wheel stroke, so that the detent wheel 5 is therefore driven 35° positively by the drive wheel 14, at which point the end of the solenoid's rotary stroke is reached, as shown in Figure 4. At this time, the roller 10, having been forced out of its previous detent and rolled around toward the next following detent, will be positioned exactly 1° short of the bottom of said next following detent. Then, a 1° "coast" or overtravel of the detent wheel 5 past its positively driven position is accomplished by inertia and by pressure of the spring-loaded roller 10 against the side of the detent, and the detent wheel 5 is brought to rest by the roller 10 just 36° or one increment from its previous position.

When the rotary solenoid is deenergized at the 45° position, it returns in a rotary manner as pulled by the spiral spring 22, and is also likely to be kicked back longitudinally by the cam action on the back surfaces (shallow slopes) of the ratchet teeth, since there is no longitudinal pull at this time to keep the ball bearing means 21 in contact on both sides of the balls thereof. However, this "kick-out" by the backs of the teeth does not drive the detent wheel 5 backwardly at all, because it is being forced 1° forward by the roller 10 at this time, and because of the detent wheel's inertia. On the power stroke, solenoid pull definitely keeps the armature 19 pulled inwardly against the ball bearing means. Since all ratchet teeth are spaced 36° from each other, the ratchet drive wheel 14 always returns to a point 10° back of the engaging position with the teeth of the detent wheel 5.

Therefore, one, and only one, increment (36°) of detent wheel movement positively occurs with each cycle of solenoid operation. It is important to note that the highest possible speed of solenoid operation on each stroke can be utilized, since the engaged position of the teeth at the end of the power stroke always stops the detent wheel and prevents it from over-shooting past the desired detent position, even in the case of a "flywheel" load.

The ratchet teeth on the opposite side of the detent wheel 5 are similarly angularly displaced 10° ahead of a zero position, so that operation of the identical other solenoid and ratchet drive wheel 15 assembly has the same "lead-in" timing. Locating pins 26 in the solenoid assemblies 16 mate with slots 27 in the collar 12 for proper alignment during assembly. The stepper motor will thus be accurately driven in either a forward or reverse direction, in accordance with alternate operation of the rotary solenoids.

The stepper motor of the present invention is designed to operate at speeds up to 30 pulses per second on a 50% duty cycle. During final acceptance tests of the present construction, the device was operated at 10 to 12 pulses per second for 1,388,610 cycles with an error of one pulse.

Various increments, angular ranges, longitudinal stroke distances, numbers of teeth, mechanical arrangements, and so forth, may be selected, to function in the same manner taught herein. Any other suitable stepping driver means or ratchet relay may also be used in place of the rotary solenoid shown herein, as long as the desired rotary and longitudinal movement is present.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. An incremental stepping motor comprising an end-engaging drive member having a limited rotary and longitudinal motion with a start and finish of a power stroke, an elastic return means to said start position, an end-engaging driven member rotatably positioned coaxially with and opposite to said drive member and having substantially no longitudinal movement, elastic projection and detent means for retaining said driven member in any of a plurality of equally spaced incremental rotary positions in the absence of overpowering force, driving means comprising at least one ratchet drive tooth arranged on the perimeter of the drive end of said drive member, driven means comprising a series of ratchet teeth arranged circularly on the driven end of said driven member operatively adjacent said driving means, there being one definite detent position corresponding to each of the ratchet teeth of said series, "lead-in" timing wherein the rotary travel of said drive member during said power stroke is substantially greater than the angular distance between each of said incremental positions of said driven member, and an angular lead substantially equal to this difference between said stroke and said travel being provided between said start position and a first contact position of said driving means with said driven means, whereby one power stroke and return of said drive member rotates said driven member one increment.

2. Apparatus in accordance with claim 1 including overtravel timing wherein the finish position of said power stroke is slightly short of that required to maintain driving contact with said driven means at each new incremental position of said driven member.

3. An incremental stepping motor comprising an elastic-return rotary solenoid wherein the movement of an armature by a magnet imparts rotary movement to a part connected with the armature; said rotary solenoid including a hollow armature shaft, and an open center end-engaging ratchet drive member fixed to one end of said hollow armature shaft; an output shaft rotatably mounted within said hollow armature shaft; an end-engaging ratchet driven member attached on said output shaft opposite said ratchet drive member, said driven member and said output shaft adapted to be connected to a load to be rotated; spring-loaded detent means connected to said ratchet driven member to retain said driven member in any of a plurality of incremental positions in the absence of overpowering force caused by solenoid energization; one ratchet tooth on said driven member for each of said plurality of incremental positions.

4. Apparatus in accordance with claim 3 wherein said ratchet driven member has a set of identical ratchet driven teeth on each end thereof, and including a second, identical rotary solenoid with its ratchet drive member positioned facing the opposite side of said driven member from the first solenoid, said output shaft extending through both solenoids and having means on one end external of said stepping motor for connection to a load, whereby reversible operation is provided.

5. Apparatus in accordance with claim 4 including means for mounting and aligning each of said solenoids at a single predetermined position, only, with respect to each other and to the incremental positions of said driven member, whereby the position of the teeth of said drive members of said identical solenoids is identical whether placed on either side of said stepping motor; wherein the rotary power stroke of each said solenoid is substantially greater than the angular distance between said incremental positions of said driven member by a predetermined amount, the teeth on one side of said driven member being displaced from those on the opposite side by an angular distance twice said predetermined amount, and wherein said detent means is positioned to determine said incremental positions substantially coinciding with the finish of the power stroke of each said solenoid, whereby a solenoid can be installed at either end of said stepping motor to obtain the desired "lead-in" timing where the start position of said drive member is ahead of the engagement position with said driven member by said predetermined amount.

6. Apparatus in accordance with claim 5 wherein the finish position of each solenoid's power stroke is slightly short of that required to maintain driving contact with its respective cooperating teeth of said driven member at each new incremental position of said driven member, whereby the resultant overtravel of said driven member prevents interference of said drive members therewith and provides more accurate high speed operation.

7. Apparatus in accordance with claim 3 wherein the rotary power stroke of said solenoid is substantially greater than the angular distance between said incremental positions, and wherein the start position of said drive member is several degrees ahead of the tooth engagement position thereof with the teeth on said driven member.

8. Apparatus in accordance with claim 3 wherein the rotary power stroke of said solenoid is greater than the angular distance between said incremental positions, wherein the start position of said drive member is several degrees ahead of the tooth engagement position thereof with the teeth of said driven member, and wherein the finish position of said power stroke is slightly short of that necessary to maintain driving contact with said driven member teeth at each new incremental position thereof.

9. Apparatus in accordance with claim 3 wherein said rotary solenoid has a rotary power stroke of 45°, said ratchet driven member having ten detented incremental positions spaced 36° apart, said ratchet drive member having drive teeth aligned at a zero-degree reference position at the start of said power stroke, thereby ending said power stroke at 45° forward in the driven direction, and said detented positions of said driven member fixed to align said teeth thereon at a 10° forward position, whereby is provided a 10° lead-in rotation of said drive member before the drive and driven teeth come into driving engagement, and whereby said driven member has a 1° overtravel beyond the end of its positive contact position with said drive member to place it in the next detented position to which it is driven.

References Cited in the file of this patent

UNITED STATES PATENTS

| | | |
|---|---|---|
| 2,428,882 | Kloff | Oct. 14, 1947 |
| 2,433,608 | Handley | Dec. 30, 1947 |
| 2,496,880 | Leland | Feb. 7, 1950 |